United States Patent
Yamaguchi et al.

(10) Patent No.: US 10,308,079 B2
(45) Date of Patent: Jun. 4, 2019

(54) PNEUMATIC TIRE FOR HEAVY LOADS

(71) Applicant: The Yokohama Rubber Co., LTD., Minato-ku, Tokyo (JP)

(72) Inventors: Yukihito Yamaguchi, Hiratsuka (JP); Shoei Kakuta, Hiratsuka (JP); Hideki Hamanaka, Hiratsuka (JP); Risa Tauchi, Hiratsuka (JP); Toshiyuki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/328,397

(22) PCT Filed: Jul. 23, 2015

(86) PCT No.: PCT/JP2015/070931
§ 371 (c)(1),
(2) Date: Jan. 23, 2017

(87) PCT Pub. No.: WO2016/013601
PCT Pub. Date: Jan. 28, 2016

(65) Prior Publication Data
US 2017/0210178 A1     Jul. 27, 2017

(30) Foreign Application Priority Data

Jul. 23, 2014   (JP) .................................. 2014-149822
May 13, 2015   (WO) .................. PCT/JP2015/063719

(51) Int. Cl.
*B60C 11/11*   (2006.01)
*B60C 11/13*   (2006.01)
*B60C 11/03*   (2006.01)

(52) U.S. Cl.
CPC .............. *B60C 11/13* (2013.01); *B60C 11/03* (2013.01); *B60C 11/11* (2013.01);
(Continued)

(58) Field of Classification Search
CPC ......... B60C 11/0311; B60C 2011/0348; B60C 2011/0353; B60C 2200/065
See application file for complete search history.

(56) References Cited

U.S. PATENT DOCUMENTS

| D457,128 S | * | 5/2002 | Robert ......................... D12/579 |
| 2007/0199633 A1 | | 8/2007 | Hayashi |

(Continued)

FOREIGN PATENT DOCUMENTS

| JP | H09-136514 | 5/1997 |
| JP | 2001315507 A | * 11/2001 .......... B60C 11/0311 |

(Continued)

OTHER PUBLICATIONS

Machine Translation: JP-2008114738-A; Yoda, Hidetoshi; no date.*
(Continued)

*Primary Examiner* — Kendra Ly
(74) *Attorney, Agent, or Firm* — Thorpe North & Western

(57) ABSTRACT

A tread pattern of a pneumatic tire comprises shoulder lug grooves that open to ground contact edges; center lug grooves; a pair of circumferential primary grooves with a narrower groove width than the shoulder lug grooves, wherein a portion that bends outward in the tire width direction connects to the shoulder lug grooves and a portion that bends inward in the tire width direction connects to the center lug grooves; and center blocks defined by the center lug grooves and the circumferential primary grooves. The circumferential primary grooves are on opposite sides in the tire width direction in regions spaced from a center line by a distance of from 30% to 60% of half of a tread width T. The ratio of the groove width P3 of the center lug grooves to the maximum length LB in the tire circumferential direction of the center blocks is from 0.03 to 0.07.

9 Claims, 7 Drawing Sheets

(52) U.S. Cl.
CPC .............. *B60C 2011/0346* (2013.01); *B60C 2011/0355* (2013.01); *B60C 2011/0365* (2013.01); *B60C 2011/1361* (2013.01); *B60C 2200/065* (2013.01)

(56) References Cited

U.S. PATENT DOCUMENTS

| | | |
|---|---|---|
| 2008/0078488 A1 | 4/2008 | Yoda |
| 2009/0032157 A1* | 2/2009 | Inoue .............. B60C 11/0311 152/209.8 |

FOREIGN PATENT DOCUMENTS

| | | | | |
|---|---|---|---|---|
| JP | 2004-098914 | 4/2004 | | |
| JP | 2004-224131 | 8/2004 | | |
| JP | 2006-151083 | 6/2006 | | |
| JP | 2007-191093 | 8/2007 | | |
| JP | 2008114738 A * | 5/2008 | ............ | B60C 11/01 |
| JP | 2008-279976 | 11/2008 | | |
| JP | 2008279976 A * | 11/2008 | .......... | B60C 11/0311 |
| JP | 2010-125999 | 6/2010 | | |
| WO | WO 2006/001202 | 1/2006 | | |
| WO | WO 2006/057169 | 6/2006 | | |

OTHER PUBLICATIONS

Machine Translation: JP-2001315507-A; Ito, Kuniaki; no date.*
Machine Translation: JP-2008279976-A; Kawai, Toshiyuki; no date.*
International Search Report for International Application No. PCT/JP2015/070931 dated Aug. 25, 2015, 4 pages.

* cited by examiner

PNEUMATIC TIRE FOR HEAVY LOADS

TECHNICAL FIELD

The present technology relates to a heavy duty pneumatic tire with a tread pattern.

BACKGROUND ART

There is currently a demand for pneumatic tires to be improved in various performance areas. Such improvement may be realized through the design of tread patterns. Heavy duty tires have been provided with a tread pattern designed with improved traction performance in mind.

For example, a heavy duty pneumatic tire is known which improves both traction characteristics on bad roads until the terminal stage of wear and wet performance at high-speeds in a compatible manner (see Japanese Unexamined Patent Application Publication No. H09-136514A). This heavy duty pneumatic tire is a pneumatic tire that includes a tread provided with at least one circumferential groove extending in the circumferential direction, and a plurality of lateral grooves disposed on opposite sides of the circumferential groove at intervals in the circumferential direction, the plurality of lateral grooves being connected to the circumferential primary groove, wherein (1) the at least one circumferential groove extends in the circumferential direction in a tread central region corresponding to 50% of the tread width;

(2) a groove depth of the at least one circumferential groove is 5% or greater of the tread width; and (3) a lateral groove of the plurality of lateral grooves provided in at least both side portions of the tread has a groove depth 109% of the groove depth of the at least one circumferential groove.

This pneumatic tire is described as being capable of improving traction characteristics on bad roads and wet performance at high speeds in a compatible manner.

The heavy duty pneumatic tire described above is capable of improved traction characteristics in the terminal stage of wear. However, up until the terminal stage of wear, the tread center region wears more quickly than the tread shoulder regions.

SUMMARY

In particular, for pneumatic tires mounted on buses or trucks, and 49 inch or greater large tires mounted on dump trucks that travel off-road for mining and the like, improved traction performance and improved wear resistance of the tread center region are desirable for effective use of the tire.

The present technology provides a heavy duty pneumatic tire with a tread pattern capable of improved wear resistance of a tread center region while at least maintaining traction performance.

One aspect of the present technology is a pneumatic tire with a tread pattern.

The tread pattern comprises a plurality of center lug grooves disposed at intervals in a tire circumferential direction, the plurality of center lug grooves each crossing a tire equator line and extending in a half-tread region on a first side and a second side of the tire equator line in a tire width direction with opposite ends disposed on the first side and the second side, respectively, a plurality of shoulder lug grooves disposed at intervals in the tire circumferential direction, the plurality of shoulder lug grooves extending outward in the tire width direction in both of half-tread regions so that outer ends in the tire width direction open to ground contact edges on opposite sides in the tire width direction, and with respect to the tire circumferential direction, the plurality of shoulder lug grooves each being disposed between ends of center lug grooves adjacent in the tire circumferential direction of the plurality of center lug grooves, a pair of circumferential primary grooves disposed in the half-tread regions with a wave-like shape, the circumferential primary grooves extending around an entire circumference of the pneumatic tire with the ends of the plurality of the center lug grooves and inner ends of the plurality of shoulder lug grooves in the tire width direction alternately connecting to the circumferential primary grooves in both of the half-tread regions, and the circumferential primary grooves having a narrower groove width than the plurality of shoulder lug grooves, and a plurality of center blocks formed in a row in the tire circumferential direction defined by the plurality of center lug grooves and the pair of circumferential primary grooves.

The circumferential primary grooves are disposed on both sides of the tire equator line in the tread portion in the tire width direction in regions spaced apart from the tire equator line by a distance of from 30% to 60% of half of a tread width T;

a ratio c/T of a lateral variation c of the wave-like shape of the pair of circumferential primary grooves to the tread width T is from 0.05 to 0.15; and a ratio P3/LB of a groove width P3 of the plurality of center lug grooves to a maximum length LB in the tire circumferential direction of the plurality of center blocks is from 0.03 to 0.07.

Preferably, the plurality of center lug grooves each comprises a first groove turning portion disposed on the first side that bends or curves protruding toward a third side in the tire circumferential direction, and a second groove turning portion disposed on the second side that bends or curves protruding toward a fourth side opposite the third side in the tire circumferential direction;

a first connection end portion on the first side and a second connection end portion on the second side where each of the center lug grooves connects to either of the circumferential primary grooves connects to inner ends in the tire width direction of the circumferential primary grooves and the second connection end portion is located further to the third side in the tire circumferential direction than the first connection end portion; and an inclination angle with respect to the tire width direction of a first straight line connecting between the first connection end portion and a protruding end where the first groove turning portion protrudes toward the third side in the tire circumferential direction and an inclination angle with respect to the tire width direction of a second straight line connecting between the second connection end portion and a protruding end where the second groove turning portion protrudes toward the fourth side in the tire circumferential direction are greater than an inclination angle with respect to the tire width direction of a third straight line connecting between the first connection end portion and the second connection end portion of each of the center lug grooves, the straight lines following center positions in a groove width direction of the center lug grooves.

Preferably, a portion of each of the center lug grooves between the protruding end where the first groove turning portion protrudes toward the third side in the tire circumferential direction and the first connection end portion is disposed on the first straight line or on the third side of the first straight line; and a portion of each of the center lug grooves between the protruding end where the second groove turning portion protrudes toward the fourth side in the tire circumferential direction and the second connection end portion is disposed on the second straight line or on the fourth side of the second straight line, relating to center positions in a groove width direction of the center lug grooves.

A raised bottom portion formed by partially making a groove depth shallow is preferably provided in each of the pair of circumferential primary grooves.

Preferably, a ratio D2/T of a shallowest groove depth D2 of the raised bottom portion to the tread width T in the tire width direction of the tread portion is less than 0.05.

A circumferential secondary groove is preferably provided in each region of the plurality of center blocks that connects center lug grooves adjacent in the tire circumferential direction of the plurality of center lug grooves, wherein the circumferential secondary groove comprises a groove turning portion with a bent shape or a curved shape.

A circumferential secondary groove is preferably provided in each region of the plurality of center blocks that connects center lug grooves adjacent in the tire circumferential direction of the plurality of center lug grooves, wherein positions where the circumferential secondary groove and the adjacent center lug grooves are connected are within a region in the tire width direction containing the first groove turning portion and the second groove turning portion between the first groove turning portion and the second groove turning portion.

Preferably, a ratio P4/WB of a groove width P4 of the circumferential secondary groove to a maximum width WB in the tire width direction of the plurality of center blocks is from 0.02 to 0.07.

Preferably, a ratio LB/WB of a maximum length LB in the tire circumferential direction of the plurality of center blocks to a maximum width WB in the tire width direction of the plurality of center blocks is from 0.6 to 0.8.

Preferably, a first groove turning portion bent or curved outward in the tire width direction and a second groove turning portion bent or curved inward in the tire width direction are disposed in the pair of circumferential primary grooves to form a wave-like shape; and the center blocks have corners in correspondence with the first groove turning portions and the corners have obtuse angles.

Preferably, the groove width of the pair of circumferential primary grooves and a groove width of the plurality of center lug grooves are from 7 mm to 20 mm.

Preferably, the heavy duty pneumatic tire is mounted on a construction vehicle or an industrial vehicle.

According to the heavy duty pneumatic tire described above, wear resistance in the tread center region can be improved while at least maintaining traction performance.

DETAILED DESCRIPTION

A pneumatic tire according to the present embodiment is described below in detail with reference to the accompanying drawings.

"Tire width direction" in the present specification refers to the direction of the center axis of rotation of the pneumatic tire. "Tire circumferential direction" refers to the direction in which the rotating surface of the tread surface rotates, the rotating surface being formed when the tire rotates about the center axis of rotation of the tire. "Tire radial direction" refers to the direction extending radially out from the center axis of rotation of the tire. "Outward in the tire radial direction" refers to the direction away from the center axis of rotation of the tire. "Inward in the tire radial direction" refers to the direction towards the center axis of rotation of the tire. "Outward in the tire width direction" refers to the direction away from the tire equator line in the tire width direction. "Inward in the tire width direction" refers to the direction toward the tire equator line in the tire width direction.

"Heavy duty pneumatic tire" in the present specification refers to tire as specified according to the Japan Automobile Tyre Manufacturers Association, Inc. (JATMA) Year Book 2014, Chapter C, as well as tires for vehicle type 1 (dump truck, scraper), type 2 (grader), type 3 (shovel loader, etc.), type 4 (tire roller), and a mobile crane (truck crane, wheel crane) as specified according to Chapter D, and tires for vehicles as specified according to Tire and Rim Association, Inc. (TRA) 2013 Year Book, Section 4 or Section 6.

Figure 1:
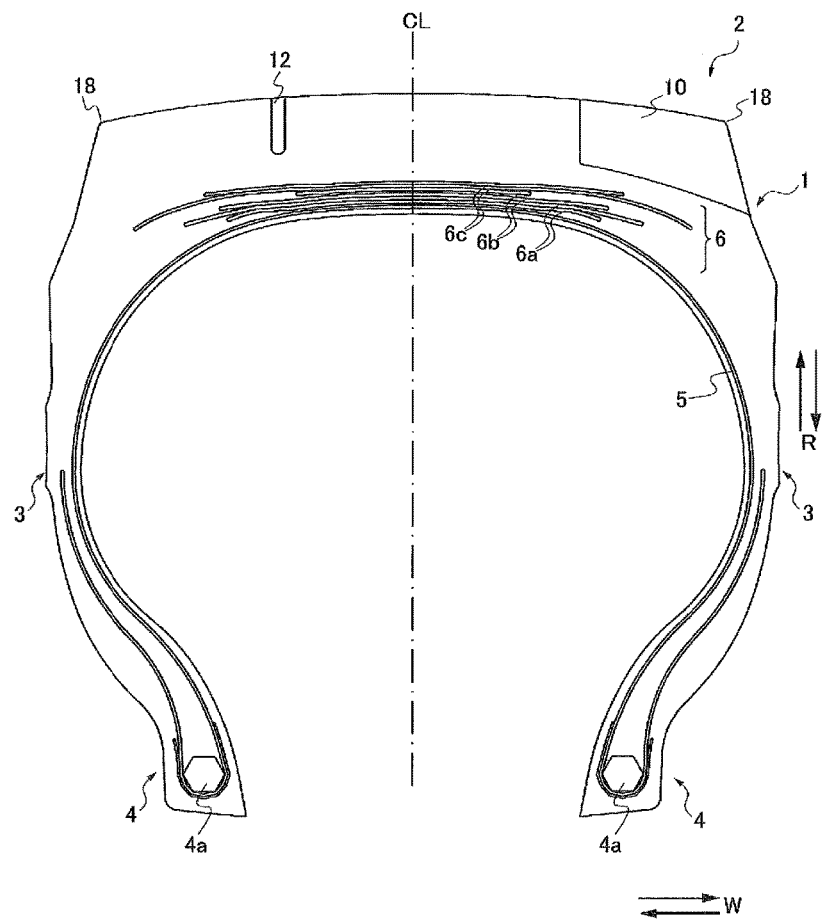
FIG. 1 is a cross-sectional view of an example of a heavy duty pneumatic tire according to the present embodiment.

FIG. 1 is a cross-sectional view of a pneumatic tire (hereinafter simply referred to as "tire") of the present embodiment. FIG. 1 is a cross-sectional view taken along line X-X of FIG. 2 and a plane that passes through a tire rotation axis. In FIG. 1, the tire radial direction is denoted by R (two arrows facing opposite directions) and the tire width direction is denoted by W (two arrows facing opposite directions).

The tire 1 illustrated in FIG. 1 includes a tread portion 2, sidewall portions 3, and bead portions 4. The bead portions 4 on opposite sides in the tire width direction each include bead cores 4a. A carcass layer 5 is laid between the pair of bead cores 4a. The carcass layer 5 is turned up at both end portions at the bead cores 4a from inward to outward of the tire. The carcass layer 5 may be composed of one carcass ply or a plurality of carcass plies.

A belt layer 6 is provided on an outer circumferential side of the carcass layer 5 in the tread portion 2. The belt layer 6 is provided with a first cross belt layer 6a, a second cross belt layer 6b, and a third cross belt layer 6c in that order from inward to outward in the tire radial direction. The first cross belt layer 6a, the second cross belt layer 6b, and the third cross belt layer 6c are each composed of two belts. The pair of belts of each of the first cross belt layer 6a, the second cross belt layer 6b, and the third cross belt layer 6c include reinforcing cords inclined with respect to the tire circumferential direction in different directions. In the belt layer 6 configuration illustrated in FIG. 1, of the two belts of the first cross belt layer 6a, the belt located radially inward has a narrower belt width in the tire width direction than the belt located outward in the tire radial direction. Of the two belts of the second cross belt layer 6b, the belt located radially inward has a wider belt width in the tire width direction than the belt located outward in the tire radial direction. Of the two belts of the third cross belt layer 6c, the belt located radially inward has a wider belt width in the tire width direction than the belt located outward in the tire radial direction. The belt width is not particularly limited, and the belt width configuration illustrated in FIG. 1 is an example. Additionally, the belt layer 6 is composed of three cross belt layers, however the belt layer 6 may be composed of two cross belt layers, and the belt configuration is not particularly limited. Furthermore, a sheet-like rubber layer may be provided in sections between the belt layers of the second cross belt layer 6b.

The reinforcing cords of the belts of the first cross belt layer 6a with the smallest angle with respect to the tire circumferential direction preferably have an inclination angle from 20 degrees to 24 degrees for the belt to suppress deformation of the tire expanding in the tire radial direction, or in other words to effectively obtain a fastening effect. The reinforcing cords of the belts of the second cross belt layer 6b with the smallest angle with respect to the tire circumferential direction preferably have an inclination angle from 16 degrees to 20 degrees for the belt to effectively obtain a fastening effect. The reinforcing cords of the belts of the third cross belt layer 6c with the smallest angle with respect to the tire circumferential direction preferably have an inclination angle from 22 degrees to 26 degrees for the belt. The inclination angle of the reinforcing cords of the belts of the first cross belt layer 6a is preferably greater than the inclination angle of that of the second cross belt layer 6b.

Such a configuration is but one possible example of the tire 1 and other known configuration may be employed.

Tread Pattern

Figure 2:
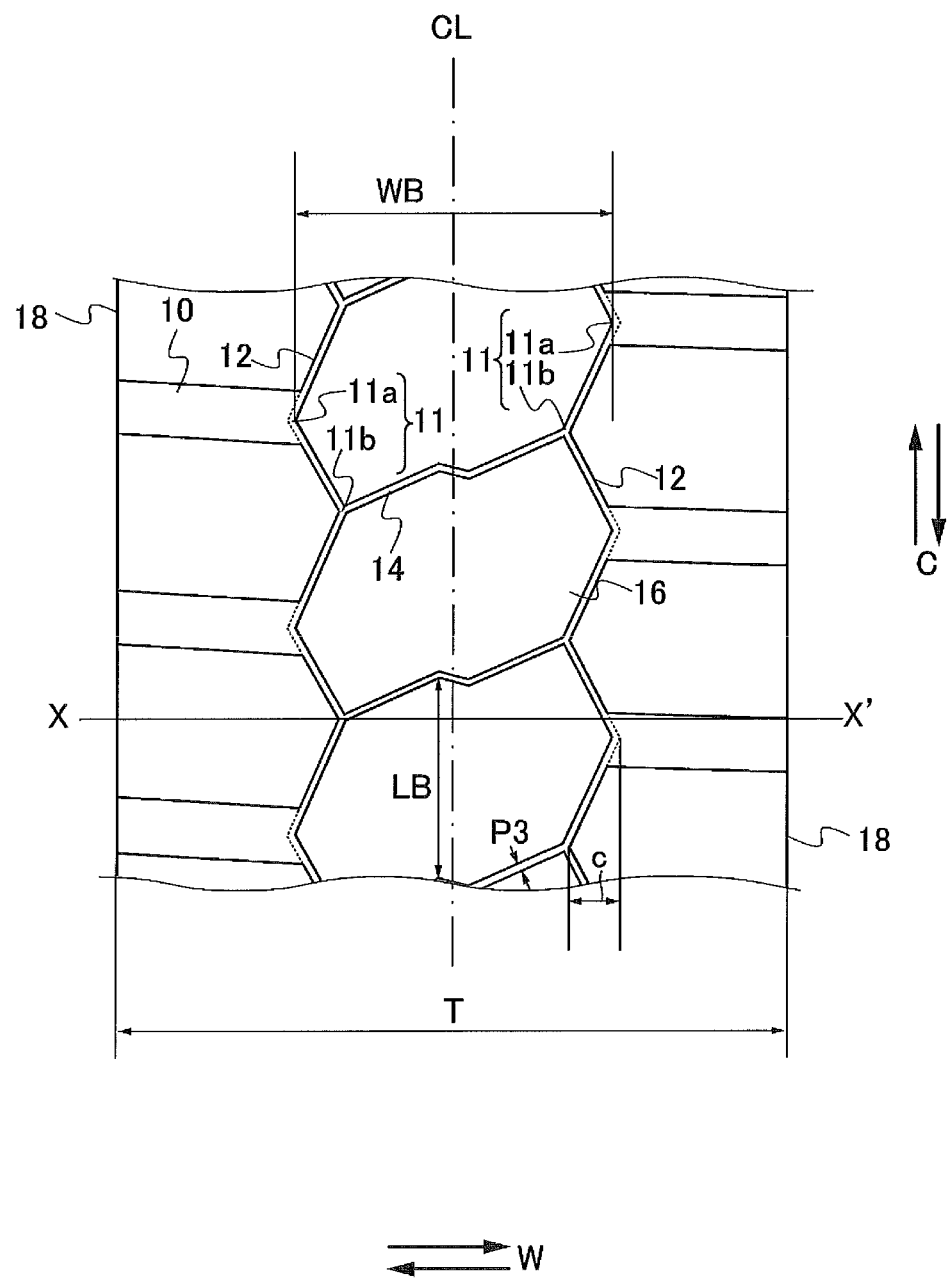
FIG. 2 is a developed plan view illustrating a tread pattern provided on a tread portion of the tire according to the present embodiment.

FIG. 2 is a developed plan view illustrating a tread pattern provided on the tread portion 2 of the tire 1. In FIG. 2, the tire circumferential direction is denoted by C and the tire width direction is denoted by W.

The tread portion 2 is provided with a tread pattern that includes shoulder lug grooves 10, a pair of circumferential primary grooves 12, center lug grooves 14, and center blocks 16.

The shoulder lug grooves 10 are disposed in half-tread regions on opposite sides (first side and second side) of the tire equator line CL in the tire width direction at intervals in the tire circumferential direction. The shoulder lug grooves 10 in the half-tread regions on opposite sides of the tire equator line CL in the tire width direction extend outward in the tire width direction. The outer ends of the shoulder lug grooves 10 in the tire width direction open to tread edges (ground contact edges) 18 on opposite sides in the tire width direction. The tread edges 18 as illustrated in FIG. 1 are the portions where external form of the tread portion 2 and the side portions 3 connect. In embodiments in which this connection portion is rounded, the tread edge 18 refers to intersections between an extension line extended from the tread portion 2 following the external form thereof and extension lines extended from the side portions 3 following the external forms thereof.

The shoulder lug grooves 10 located on opposite sides in the tire width direction have a configuration in which the position in the tire circumferential direction of the shoulder lug grooves 10 in one half-tread region is between the positions in the tire circumferential direction of adjacent shoulder lug grooves 10 of the other half-tread region.

The shoulder lug grooves 10 in the half-tread regions each include an inner end in the tire width direction located outward in the tire width direction of the position in the tire width direction of the ends of the center lug grooves 14 described below. Additionally, in the tire circumferential direction, one shoulder lug groove 10 is disposed in the shoulder regions between center lug grooves 14 adjacent in the tire circumferential direction of the center lug grooves 14. In this configuration, the ends of the center lug grooves 14 and the inner ends of the shoulder lug grooves 10 in the tire width direction alternately connect to the circumferential primary grooves 12 with a wave-like shape described below.

The pair of circumferential primary grooves 12 are disposed in half-tread regions on opposite sides (first side and second side) of the tire equator line CL in the tire width direction. In the half-tread regions, the circumferential primary grooves 12 extend around the entire circumference of the tire in a wave-like manner with the ends of the center lug grooves 14 described below and the inner ends of the shoulder lug grooves 10 in the tire width direction alternately connecting to the circumferential primary grooves 12. The pair of circumferential primary grooves 12 have a narrower groove width than the shoulder lug grooves 10. The groove has a "wave-like shape" refers to the groove having a sinuous shape. The sinuous shape of the groove is formed by groove turning portions (a third groove turning portion and a fourth groove turning portion) that turn protruding outward or inward in the tire width direction. The groove turning portions may have an angled shape or a radiused curved shape. A curved shape includes a radiused shape with a certain radius of curvature of a corner portion of a rubber block in contact with the portion of the groove with an angled shape, or in other words a groove with a curved shape formed by filleting the corner portion of the rubber block. Additionally, the portions other than the groove turning portions (the third groove turning portion and the fourth groove turning portion) described above may have a rectilinear shape or a curved shape. In embodiments in which the groove turning portions (the third groove turning portion and the fourth groove turning portion) and the portions other than the groove turning portions (the third groove turning portion and the fourth groove turning portion) have a curved shape, the curved shapes may have the same radius of curvature. Additionally, one of groove turning portions (the third groove turning portion and the fourth groove turning portion) adjacent in the tire circumferential direction may have a bent shape formed by a rectilinear shaped groove and a curved shaped groove connecting and the other may have a curved shape.

Specifically, the circumferential primary grooves 12 include around the circumference of the tire a plurality of groove turning portions 11 (third groove turning portion 11a and fourth groove turning portion 11b) that turn protruding outward or inward in the tire width direction. The circumferential primary grooves 12 extend in the tire circumferential direction in a sinuous manner having a wave-like shape in the tire width direction. The pair of circumferential primary grooves 12 each connect with the shoulder lug grooves 10 at the third groove turning portions 11a, which are the groove turning portions 11 which turn protruding outward in the tire width direction. Additionally, the pair of circumferential primary grooves 12 each connect with the center lug grooves 14 at the fourth groove turning portions 11b, which are the groove turning portions 11 which turn protruding inward in the tire width direction. The fourth groove turning portions 11b are located offset in the tire circumferential direction from the fourth groove turning portions 11b in the half-tread regions on opposite sides. Thus, the center lug grooves 14 extend in a direction inclined with respect to the tire width direction. Furthermore, the circumferential primary grooves 12 have a narrower groove width than the shoulder lug grooves 10.

A plurality of the center lug grooves 14 are disposed at intervals in the tire circumferential direction. The center lug grooves 14 cross the tire equator line CL and extend in the half-tread regions of opposite sides (the first side and the second side) of the tire equator line CL in the tire width direction to two ends. Additionally, the center lug grooves 14 at opposite ends connect to the pair of circumferential primary grooves 12 at fourth groove turning portions 11b, which are the groove turning portions 11 that turn protruding inward in the tire width direction. The center lug grooves 14 intersect the tire equator line CL. Note that the wave-like shapes of the pair of circumferential primary grooves 12 have a predetermined wave length. The phases in the tire circumferential direction of these two wave-like shapes are offset by appropriately half a pitch. In other words, the third groove turning portion 11a of one of the circumferential primary grooves 12 is located at a position in the tire circumferential direction between third groove turning portions 11a of the other circumferential primary groove 12 adjacent in the tire circumferential direction. The third groove turning portion 11a of one of the circumferential primary grooves 12 is located at substantially the same position in the tire circumferential direction as the fourth groove turning portion 11b of the other circumferential primary groove 12.

Figure 3:
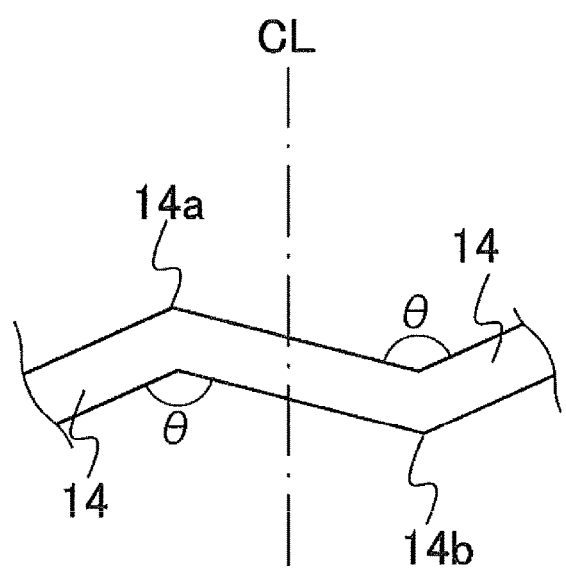
FIG. 3 is an enlarged view of a center lug groove provided in the tire according to the present embodiment.

The center lug grooves 14 are each provided with a first groove turning portion 14a and a second groove turning portion 14b, both having a bent shape. FIG. 3 is an enlarged view illustrating the first groove turning portion 14a and the second groove turning portion 14b, which are portions of the center lug grooves 14 with a bent shape.

The first groove turning portion 14a is disposed on the left side (first side) of the tire equator line CL in the tire width direction as illustrated in FIG. 2 and has a bent shape or curved shape that protrudes toward the upper side (third side) in the tire circumferential direction as illustrated in FIGS. 2 and 3. The second groove turning portion 14b is disposed on the right side (second side) as illustrated in FIG. 2 and has a bent shape or curved shape that protrudes toward the lower side (fourth side) in the tire circumferential direction as illustrated in FIG. 3.

Note that in the present embodiment, the first groove turning portion 14a and the second groove turning portion 14b have a bent shape, but in other embodiments may have a curved shape. A curved shape includes a radiused shape with a certain radius of curvature of a corner portion of a rubber block in contact with the portion of the groove with an angled shape, or in other words a groove with a curved shape formed by filleting the corner portion of the rubber block.

The center lug grooves 14 deviate in a wave-like manner in the tire circumferential direction due to being provided with the first groove turning portion 14a and the second groove turning portion 14b. The shape of the first groove turning portion 14a and the second groove turning portion 14b is preferably such that the angle θ (see FIG. 3) of turning of the center lug grooves 14 formed by the first groove turning portion 14a and the second groove turning portion 14b is obtuse, for example. The first groove turning portion 14a and the second groove turning portion 14b are preferably located on opposite sides of the tire equator line CL in the tire width direction the same distance spaced apart from the tire equator line CL. The tire equator line CL preferably passes through the portion of the center lug groove 14 between the first groove turning portion 14a and the second groove turning portion 14b, and the direction of inclination of the center lug groove 14 with respect to the tire width direction at this portion is preferably different from other portions.

The center lug grooves 14 of the present embodiment are each composed of a rectilinear portion extending in a rectilinear manner, the first groove turning portion 14a and the second groove turning portion 14b between the pair of circumferential primary grooves 12. However, a curved groove may be employed instead of the rectilinear portion. Additionally, one of the first groove turning portion 14a and the second groove turning portion 14b may have a bent shape and the other may have a curved shape. In embodiments in which the first groove turning portion 14a and the second groove turning portion 14b have a curved shape and a curved groove is employed instead of the rectilinear portion, the two curved shapes may have the same radius of curvature. Additionally, one of the first groove turning portion 14a and the second groove turning portion 14b may have a bent shape formed by a rectilinear groove and a curved groove connecting, and the other may have a curved shape. The shape of the center lug grooves 14 may deviate in a wave-like manner in the tire circumferential direction and have a groove form that extends in the tire width direction.

A plurality of the center blocks 16 defined by the center lug grooves 14 and the circumferential primary grooves 11A, 11B in such a manner are disposed in a row in the tire circumferential direction. The tire equator line (tire center line) CL passes through the center blocks 16.

Figure 4:
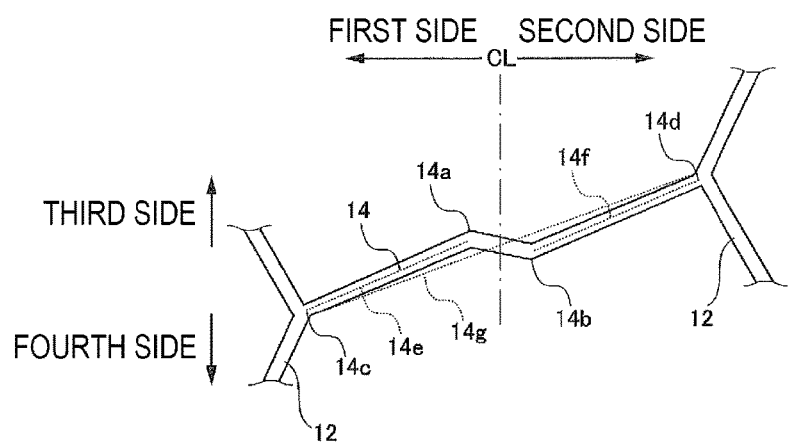
FIG. 4 is a view for explaining a preferred example of the center lug groove of the tread pattern according to the present embodiment.

FIG. 4 is a view for explaining a preferred example of a center lug groove 14 with a certain configuration. As illustrated in FIG. 4, the first groove turning portion 14a of the center lug groove 14 is disposed on the first side (left side in FIG. 4) of the tire equator line CL and bends or curves protruding toward the third side (upper side in FIG. 4) in the tire circumferential direction.

The second groove turning portion 14b of the center lug groove 14 is disposed on the second side (right side in FIG. 4) of the tire equator line CL and bends or curves protruding toward the fourth side (lower side in FIG. 4) in the tire circumferential direction. The fourth side is the side opposite the third side. Here, a first connection end portion 14c where the center lug groove 14 and the circumferential primary groove 12 connects on the first side and a second connection end portion 14d where the center lug groove 14 and the circumferential primary groove 12 connect on the second side correspond to the inner ends of the circumferential primary groove 12 in the tire width direction, or in other words the second groove turning portions 11b, 11b. Because the center lug grooves 14 are inclined with respect to the tire width direction, the second connection end portion 14d of the center lug groove 14 is located further to the third side (upper side in FIG. 3) in the tire circumferential direction than the first connection end portion 14c.

An inclination angle (an inclination angle that is greater than 0 degrees and less than 90 degrees) with respect to the tire width direction of a first straight line 14e that joins a protruding end where the first groove turning portion 14a protrudes toward the third side (upper side in FIG. 3) in the tire width direction and the first connection end portion 14c and an inclination angle (an inclination angle that is greater than 0 degrees and less than 90 degrees) with respect to the tire width direction of a second straight line 14f that joins a protruding end where the second groove turning portion 14b protrudes toward the fourth side in the tire width direction are preferably greater than an inclination angle (an inclination angle that is greater than 0 degrees and less than 90 degrees) of a third straight line 14g that joins the first connection end portion 14c and the second connection end portion 14d of the center lug groove 14, the straight lines following center positions in a groove width direction of the center lug groove 14.

In another preferred embodiment, as illustrated in FIGS. 2 and 4, the portion of the center lug groove 14 between the protruding end where the first groove turning portion 14a protrudes toward the third side in the tire circumferential direction and the first connection end portion 14c is disposed on the first straight line 14e or on the third side of the first straight line 14e, and the portion of the center lug groove 14 between the protruding end where the second groove turning portion 14b protrudes toward the fourth side in the tire circumferential direction and the second connection end portion 14d is disposed on the second straight line 14f or on the fourth side of the second straight line 14f, relating to center positions in the groove width direction of the center lug groove 14.

By the center blocks 16 having such a configuration, tread rigidity of the center blocks 16 can be increased. In other words, the center blocks 16 are anisotropic with a specified form rendered by the center lug grooves 14 inclined in one direction with respect to the tire width direction. Thus, on the tire ground contact surface, when the center blocks 16 separate from the road surface and kicked back, the anisotropic shape makes the center blocks 16 deform by twisting in a clockwise or anticlockwise direction. When this happens, because the circumferential primary grooves 12 have a narrow groove width, the center blocks 16 interlock with the should block adjacent in the tire width direction on the other side of the circumferential primary groove 12 at the third groove turning portion 11a and the fourth groove turning portion to function integrally, and the center blocks 16 adjacent in the tire circumferential direction on either side of the center lug groove 14 interlock at the first groove turning portion 14a and the second groove turning portion 14b to function integrally. As a result, tread rigidity of the center blocks 16 can be increased. By increasing the tread rigidity of the center blocks 16, twisting of the center blocks 16 can be suppressed. As a result, wear in localized region of the center blocks 16 on opposite sides in the tire circumferential direction of the center lug groove 14 can be suppressed.

Additionally, by providing the center lug groove 14 with the first groove turning portion 14a and the second groove turning portion 14b, when the center blocks 16 separate from the road surface and kicked back, the center blocks 16 at all portions experiences collapse deformation caused by shear force in the tire circumferential direction acting on all portions due to the interaction with the road surface. When this happens, the land portions around the first groove turning portion 14a and the second groove turning portion 14b of the center block 16 interlock and two blocks adjacent in the tire circumferential direction function as one to produce a counter force. Accordingly, by providing the center lug groove 14 with the first groove turning portions 14a, 14b, tread rigidity of the center blocks 16 can be increased. By increasing the tread rigidity of the center blocks 16, collapsing of the center blocks 16 can be suppressed. As a result, wear in localized region of the center blocks 16 on opposite sides in the tire circumferential direction of the center lug groove 14 can be suppressed.

The pair of circumferential primary grooves 12 are provided on opposite sides in the tire width direction in the tread portion 2 in regions spaced apart from the tire equator line CL a distance from 30% to 60% of half of the tread width T. In other words, the pair of circumferential primary grooves 12 are fully contained in the regions described above. Additionally, a ratio c/T of a lateral variation c (see FIG. 2) of the wave-like shape of the pair of circumferential primary grooves 12 to the tread width T (see FIG. 2) is from 0.05 to 0.15. A ratio P3/LB of a groove width P3 (see FIG. 2) of the center lug groove 14 to a maximum length LB (see FIG. 2) in the tire circumferential direction of the center block 16 is from 0.03 to 0.07.

"Tread width T" refers to a periphery length along the external form of the curved tread portion 2 between the tread edges 18 on opposite sides in the tire width direction. "Lateral variation c of the wave-like shape of the pair of circumferential primary grooves 12" refers to the distance in the tire width direction between the position of the third groove turning portion 11a (the outermost position in the tire width direction of the circumferential primary grooves 12) and the position of the fourth groove turning portion 11b (the innermost position in the tire width direction of the circumferential primary grooves 12). "Maximum length LB in the tire circumferential direction of the center block 16" refers to the maximum length of the center block 16 out of the lengths in the tire circumferential direction measured at all positions in the tire width direction. "Groove width P3 of the center lug groove 14" refers to the maximum width of the center lug groove 14. Note that in the present embodiment, the groove width P3 of the center lug groove 14 is constant.

By providing the pair of circumferential primary grooves 12 on opposite sides in the tire width direction in regions spaced apart from the tire equator line CL a distance from 30% to 60% of half of the tread width T, the size of the shoulder blocks defined by adjacent shoulder lug grooves 10 and the circumferential primary grooves 12 can be made similar to the size of the center blocks 16, thus giving them similar block rigidity. As a result, the wear rate of the tread center region and the tread shoulder region of the tread portion 2 can be made similar and the wear resistance of the tread center region can be improved. Accordingly, uneven wear between the tread shoulder regions and the tread center region can be suppressed. The positions of the pair of circumferential primary grooves 12 is preferably on opposite sides in the tire width direction in regions spaced apart from the tire equator line CL a distance from 35% to 55% of half of the tread width T from the perspective of lessening the difference in the block rigidity described above between the tread shoulder regions and the tread center region.

By setting the ratio c/T of the lateral variation c to the tread width T to from 0.05 to 0.15, the difference in block rigidity between the tread center region and the tread shoulder regions can be lessened. Additionally, in embodiments in which the center block 16 has corners corresponding to the third groove turning portion 11a, the corners may have obtuse angles. In embodiments in which the corners have a curved shape, the curved shape may have a great radius of curvature. Such configurations enable localized wear centering at the corners to be suppressed. If the ratio c/T is less than 0.05, the circumferential primary grooves 12 become similar to rectilinear primary grooves extending in a rectilinear manner in the tire circumferential direction and block rigidity around the rectilinear primary grooves becomes significantly low relative to a central portion (inner portion distanced from the edges) of the center blocks 16 and a central portion (inner portion distanced from the edges) of the shoulder blocks. As a result, the difference in block rigidity between the portions around the primary grooves and the central portions becomes greater, and thus the portions around the primary grooves wear quickly. If the ratio c/T is greater than 0.15, in embodiments in which the third groove turning portion 11a of the center block 16 has an angled corner, the angle becomes acute, and in embodiments in which it has a curved shape, the curved shape takes on a low radius of curvature. As a result, the corner with the acute angle or low radius of curvature is susceptible to becoming the center of uneven wear. Additionally, by setting the ratio P3/LB of the maximum length L of the center block 16 to the width P3 to from 0.03 to 0.07, the length of the center block 16 in the tire circumferential direction can be made appropriate. A reduction in block rigidity is also suppressed, and thus uneven wear between the tread shoulder regions and the tread center region can be suppressed. As a result, good traction performance and uneven wear resistance can be achieved in a compatible manner.

Figure 5:
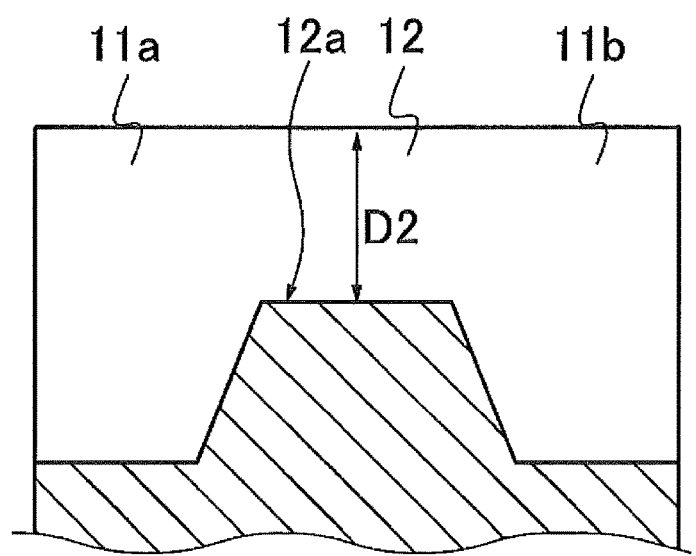
FIG. 5 is a view illustrating an example of a raised bottom portion in a circumferential primary groove provided in the tire according to the present embodiment.

In a preferred embodiment of the tread pattern, a raised bottom portion 12a is preferably provided in each of the pair of circumferential primary grooves 12 which is a portion where groove depth is shallow. FIG. 5 is a view illustrating an example of the raised bottom portion 12a. By providing the circumferential primary grooves 12 with the raised bottom portion 12a, tread rigidity of the center blocks 16 can be maintained in a predetermined range and collapsing of the center blocks 16 can be suppressed, which aids traction performance. Because collapsing of the center blocks 16 is suppressed, wear around the edges of the blocks can be suppressed. As illustrated in FIG. 5, the raised bottom portion 12a is provided in a portion between the third groove turning portion 11a and the fourth groove turning portion 11b that extends inclined with respect to the tire circumferential direction. However, the raised bottom portion 12a may be provided in a region of the third groove turning portion 11a or the fourth groove turning portion 11b of the circumferential primary groove 12. The circumferential primary groove 12 includes a deepest region where the groove depth is constantly the deepest. The raised bottom portion 12a is the portion with a shallower groove depth than this region. Note that the deepest groove depth of the circumferential primary grooves 12 is preferably the same as the groove depth of the shoulder lug grooves 10.

The raised bottom portion 12a may have a configuration in which from the deepest region, groove depth becomes shallow in a non-continuous manner in steps, gradually becomes shallow, or becomes shallow in one portion before becoming deeper to a groove depth shallower than that of the deepest region. Such a raised bottom portion 12a may have a constant shallow groove depth, but this is not required and the groove depth may vary.

In such embodiments, a ratio D2/T of the shallowest groove depth D2 of the raised bottom portion 12a (see FIG. 5) to the tread width T in the tire width direction of the tread portion is preferably less than 0.05. If the ratio D2/T is 0.05 or greater, the groove depth of the raised bottom portion becomes deep relative to the tread width T and collapsing of the blocks of the center blocks 16 becomes difficult to suppress. The ratio D2/T is preferably 0.04 or less, for example, 0.03. The minimum value of the ratio D2/T is not particularly limited and is, for example, 0.01.

If the ratio D2/T is 0.05 or greater, the groove depth of the raised bottom portion 12a becomes deep relative to the tread width T. As a result, the difference between block rigidity around the raised bottom portion 12a of the center block 16 and block rigidity of a central portion (inner portion distanced from the edges of the grooves provided with a raised bottom portion) of the center block 16 is greater, and thus susceptibility to uneven wear increases.

A ratio LB/WB of the maximum length LB in the tire width direction of the center blocks 16 to the maximum width WB in the tire width direction of the center blocks 16 is preferably from 0.6 to 0.8 from the perspective of making block rigidity of the center blocks 16 uniformly similar amongst not just the tire circumferential direction and the tire width direction, but also amongst any directions between the tire circumferential direction and the tire width direction. The ratio LB/WB is more preferably from 0.65 to 0.75.

In the center blocks 16, the corners of the center blocks 16 that correspond to the third groove turning portions 11a where the wave-like circumferential primary grooves 12 turn protruding outward in the tire width direction are preferably corner portions with obtuse angles from the perspective of suppressing collapsing of the center blocks 16 due to braking forces, driving forces, or lateral forces experienced by the corner portion by the corner portion not becoming the center of wear.

Additionally, the groove width of the pair of circumferential primary grooves 12 and the center lug grooves 14 is preferably from 7 mm to 20 mm from the perspective of ensuring edge components of the center blocks 16 vital for traction performance by suppressing localized wear around the circumferential primary grooves 12 and the center lug grooves 14.

Note that the tire 1 is preferably mounted to a construction vehicle or an industrial vehicle. Examples of construction vehicles and industrial vehicles include a dump truck, scraper, grader, shovel loader, tire roller, wheel crane, truck crane, as well as a compactor, earth mover, grader, loader, and dozer.

In such a manner,
the circumferential primary grooves 12 of the tire 1 are provided on opposite sides in the tire width direction in the tread portion 2 in regions spaced apart from the tire equator line CL by a distance of from 30% to 60% of half of the tread width T;
the ratio c/T of the lateral variation c of the wave-like shape of the circumferential primary grooves 12 to the tread width T is from 0.05 to 0.15; and
the ratio P3/LB of the groove width P3 of the center lug grooves 14 to the maximum length LB in the tire circumferential direction of the center blocks 16 is from 0.03 to 0.07.

Accordingly, the center blocks 16 can be made larger than conventional center blocks, thus enabling improved traction performance. Additionally, wear in the tread center region can be made similar to wear in the tread shoulder regions, thus enabling the prevention of a shortening of the life of the tire due to the progress of wear in particular in the tread center region. Furthermore, localized wear of the corners that protrude outward in the tire width direction of the center blocks 16 can be suppressed.

The tread pattern of the present embodiment has been described above as a preferred embodiment in which, as illustrated in FIG. 2, the first groove turning portions 14a and the second groove turning portions 14b are provided in the center lug grooves 14. However, instead of such center lug grooves 14, the first groove turning portions 14a and the second groove turning portions 14b may not be provided and the center lug grooves 14 may extend in a rectilinear manner inclined in the tire width direction.

Modified Example

Figure 6:
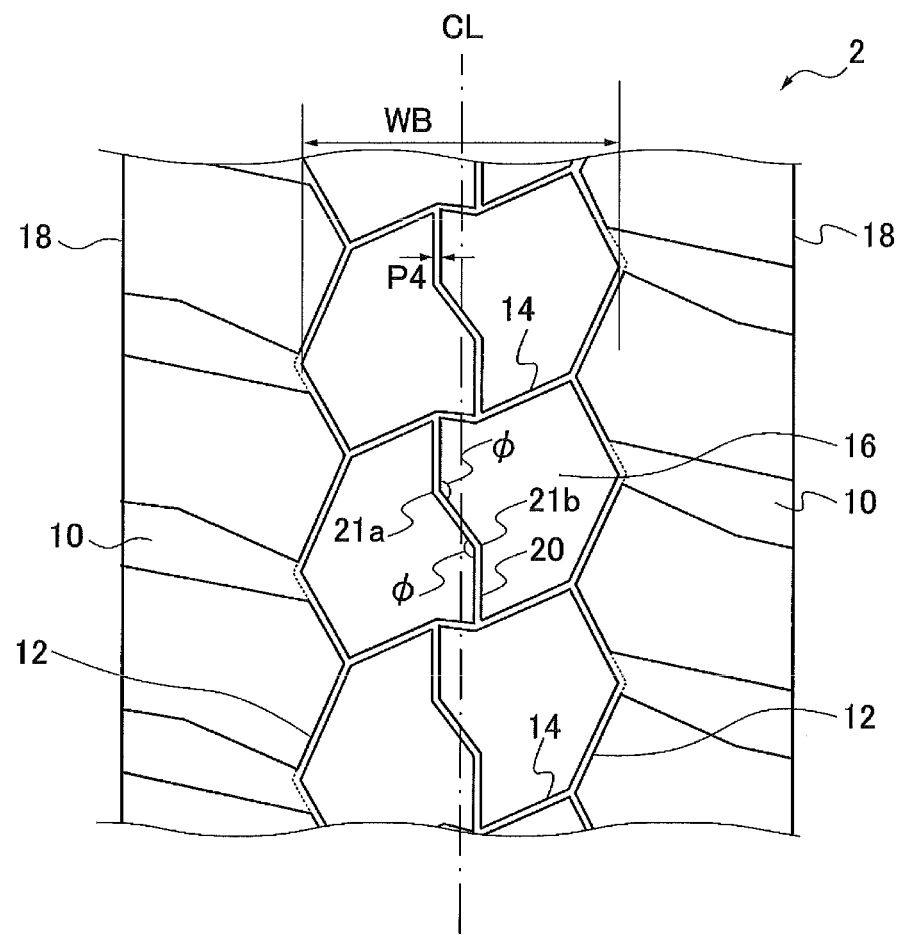
FIG. 6 is a developed plan view illustrating a modified example of the tread pattern of the tire according to the present embodiment.

FIG. 6 is a developed plan view illustrating a modified example of the tread pattern illustrated in FIG. 2. As illustrated in FIG. 6, a circumferential secondary groove 20 is preferably provided in regions in the center blocks 16. The circumferential secondary groove 20 connects center lug grooves 14 adjacent in the tire circumferential direction. The circumferential secondary groove 20, for example, preferably connects to the center lug grooves 14 at positions on the end of the first groove turning portion 14a and the second groove turning portion 14b of the center lug grooves 14 (specifically at positions protruding furthest in the tire circumferential direction from an imaginary line that joins opposite ends of the center lug grooves 14). Additionally, the circumferential secondary groove 20 preferably includes a fifth groove turning portion 21a and a sixth groove turning portion 21b. The fifth groove turning portion 21a and the sixth groove turning portion 21b may have a bent shape or a curved shape. A curved shape includes a radiused shape with a certain radius of curvature of a corner portion of a rubber block in contact with the corner portion of the groove, or in other words a groove with a curved shape formed by filleting the corner portion of the rubber block.

Additionally, the position where the circumferential secondary groove 20 and the center lug grooves 14 are connected are preferably within a region in the tire width direction containing the first groove turning portion 14a and the second groove turning portion 14b between the first groove turning portion 14a and the second groove turning portion 14b.

In the present modified example, the circumferential secondary groove 20 includes rectilinear portions extending parallel to the tire circumferential direction from the center lug grooves 14, the fifth groove turning portion 21a and the sixth groove turning portion 21b connected to the respective rectilinear portions, and an inclined portion extending between the fifth groove turning portion 21a and the sixth groove turning portion 21b at an incline in the tire circumferential direction. In the embodiment illustrated in FIG. 6, the fifth groove turning portion 21a and the sixth groove turning portion 21b provided in the circumferential secondary groove 20 have a bent shape so that an angle φ (see FIG. 6) of turning of the circumferential secondary groove 20 formed by the fifth groove turning portion 21a and the sixth groove turning portion 21b is obtuse.

One of the fifth groove turning portion 21a and the sixth groove turning portion 21b may have a bent shape and the other may have a curved shape.

In the present embodiment, the fifth groove turning portion 21a and the sixth groove turning portion 21b are provided in the circumferential secondary groove 20. However, only one groove turning portion may be provided or three or more may be provided. In such embodiments, the rectilinear portion of the circumferential secondary groove 20 is not required to extend parallel to the tire circumferential direction. Additionally, as illustrated in FIG. 6, the tire equator line CL preferably passes through the portion of the circumferential secondary groove 20 between the fifth groove turning portion 21a and the sixth groove turning portion 21b.

As illustrated in FIG. 6, the rectilinear portion of the circumferential secondary groove 20 has a groove-like shape extending parallel to the tire circumferential direction. In other embodiments however, the rectilinear portion may have a curved shape. In embodiments in which the fifth groove turning portion 21a and the sixth groove turning portion 21b have a curved shape and the rectilinear portion has a curved shape, the two curved shapes may have the same radius of curvature. Additionally, one of the fifth groove turning portion 21a and the sixth groove turning portion 21b may have a bent shape formed by a rectilinear groove and a curved groove connecting, and the other may have a curved shape. The circumferential secondary groove 20 described above includes the rectilinear portions, the fifth groove turning portion 21a and the sixth groove turning portion 21b, and the inclined portion. However, in other embodiments, the circumferential secondary groove 20 may have a groove-like shape extending in the tire circumferential direction and deviating in a wave-like manner in the tire width direction.

By disposing the circumferential secondary groove 20 in this manner, excessively high block rigidity of the center blocks 16 can be alleviated. As a result, the profile of the external form of the tread portion 2 can be prevented from being misshaped when the tire is inflated with air pressure in a manner in which the center region (region with the center blocks 16) has a large radius of curvature and the shoulder regions (regions with the shoulder lug grooves 10) have an abruptly small radius of curvature. Additionally, the profile shape of the tread portion 2 from the center region to the shoulder regions can vary in terms of the radius of curvature is a gradual manner. As a result, localized wear prone to occur around the circumferential primary grooves 12 where the curvature varies greatly can be suppressed.

Additionally, a ratio P4/WB of the groove width P4 (see FIG. 6) of the circumferential secondary groove 20 to the maximum width WB in the tire width direction of the center blocks 16 is preferably from 0.02 to 0.07. Here, in embodiments in which the circumferential secondary groove 20 has a constant groove width, the groove width P4 is a constant groove width. In embodiments in which the circumferential secondary groove 20 has a varying groove width, the groove width P4 is the maximum groove width. The maximum width WB is the total distance of the center block 16 between positions on both sides of the tire equator line CL spaced furthest apart from the tire equator line CL in the tire width direction. By setting the ratio P4/WB to from 0.02 to 0.07, block rigidity of the center blocks 16 can be made in a predetermined range.

Working Examples, Conventional Example, Comparative Examples

To examine the effects of a tire according to the present embodiment, test tires with varying tread patterns were manufactured and uneven wear resistance characteristics of the tread center region and traction performance were tested. The size of the test tires was 46/90R57. An uneven wear resistance test and a traction test were performed by driving a 200 ton dump truck on an off-road surface with the test tires being mounted to rims with a rim size of 29.00-6.0 (TRA specified rim), inflated to 700 kPa (TRA specified air pressure), and loaded with 617.81 kN (TRA standard load) so as to comply with test conditions. Uneven wear resistance performance shows the difference between the amount of wear in the tread center region compared to the amount of wear in the tread shoulder regions.

Uneven wear resistance was determined by finding the ratio of the amount of wear in the tread center region to the amount of wear in the tread shoulder regions after 5000 hours of running, and expressing the reciprocals of the ratios as index values with the ratio of the Conventional Example described below of the amount of wear in the tread center region to the amount of wear in the tread shoulder regions being defined as the reference (index value of 100). Larger index values indicate superior uneven wear resistance.

In the traction test, the tires in a new state were used and the distance it took of the vehicle to stop at a speed of 40 km/h was measured. These measurement results represent brake performance, however they may be understood as being the same as traction performance. The reciprocals of the measurement results were expressed as index values with the measurement result of the Conventional Example described below being defined as the reference (index value of 100). Larger index values indicate superior traction characteristics.

Test tires according to a Conventional Example, Working Examples 1 to 22, and Comparative Examples 1 to 7 were manufactured.

Figure 7:
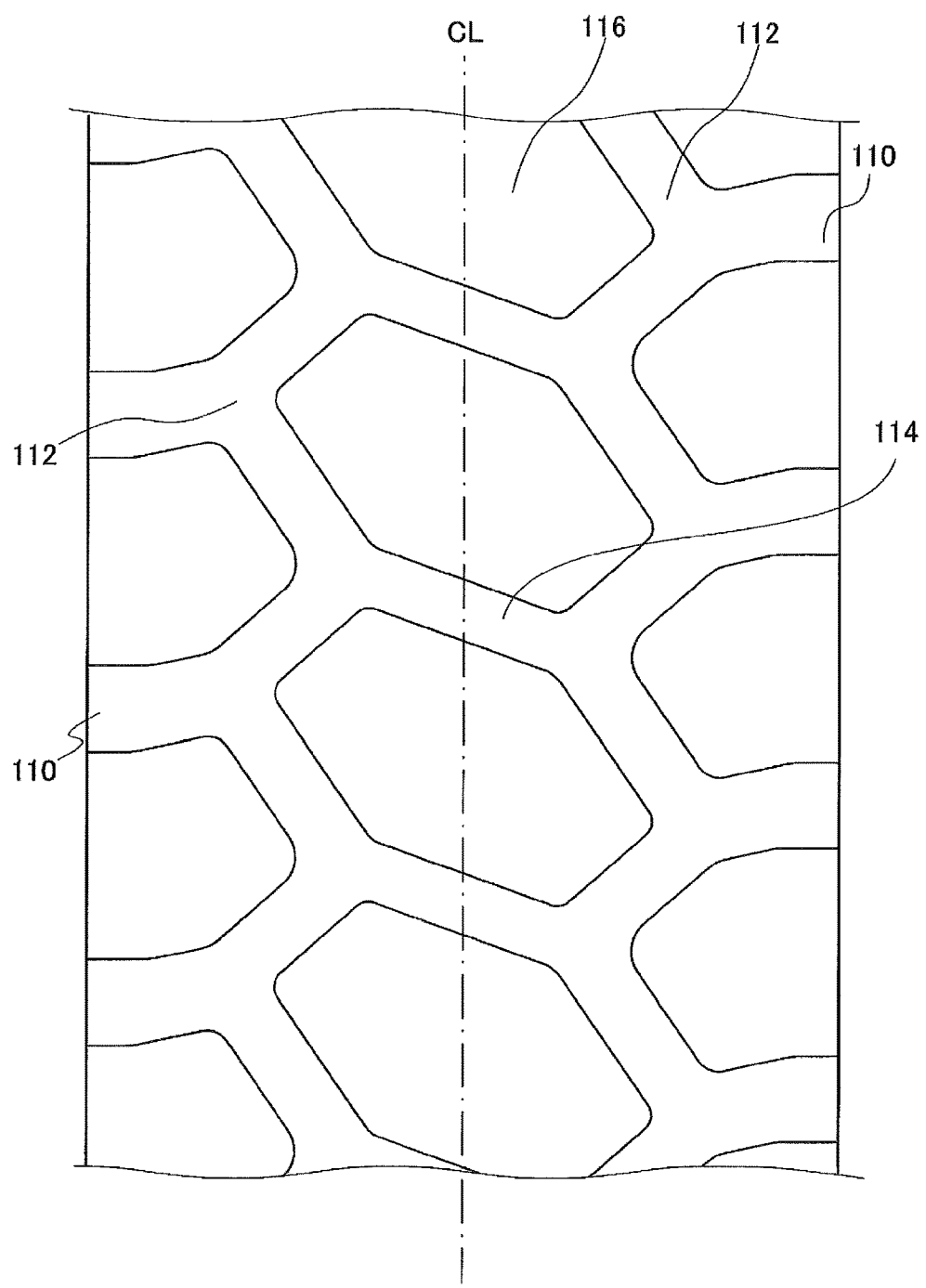
FIG. 7 is a view illustrating a tread pattern of a tire according to a conventional example.

FIG. 7 is a view illustrating the tread pattern of the Conventional Example. The tread pattern illustrated in FIG. 7 is provided with shoulder lug grooves 110, a pair of circumferential primary grooves 112, center lug grooves 114, center blocks 116. The shoulder lug grooves 110, the pair of circumferential primary grooves 112, the center lug grooves 114, and the center blocks 116 have the same configuration as their counterparts the shoulder lug grooves 10, the pair of circumferential primary grooves 12, the center lug grooves 14, and the center blocks 16. Additionally, the groove width of the shoulder lug grooves 110 and the circumferential primary grooves 112 is the same as that of the shoulder lug grooves 10. Because the groove width of the circumferential primary grooves 112 is the same as that of the shoulder lug grooves 110, the circumferential primary grooves 112 do not share the configuration of the circumferential primary grooves 12 having a narrower groove width than the shoulder lug grooves 10. As such, in the "wave-like shape circumferential primary groove" row of Table 1, the Conventional Example is marked as "Absent".

Working Examples 1 to 22 and Comparative Examples 1 to 7 employed the tread pattern illustrated in FIG. 2 or FIG. 6.

Working Examples 23 and 24 had the same configuration as Working Examples 1 and 2, except that the center lug grooves 14 of the tread pattern as illustrated in FIG. 2 were not provided with the first groove turning portion 14a and the second groove turning portion 14b making it a rectilinear inclined lug groove inclined in the tire width direction.

The configuration of the components and the evaluation results for uneven wear resistance and traction characteristics of the tread pattern are shown in Tables 1 to 5.

Table 1 shows the evaluation results for a tread pattern (Comparative Example 1) in which the position of the circumferential primary grooves, the ratio c/T, and the ratio P3/LB do not satisfy the ranges of the present embodiment, and tread patterns (Working Examples 1 to 3, and Comparative Examples 2 and 3) in which the ratio c/T and the ratio P3/LB were fixed (ratio c/T=0.1, ratio P3/LB=0.06) and the position of the circumferential primary grooves was varied.

In Tables 1 to 5, "position of circumferential primary groove" refers to the distance expressed as a percentage between the position of the circumferential primary groove closest to the tire equator line CL and the tire equator line CL and the distance expressed as a percentage between the position of the circumferential primary groove farthest from the tire equator line CL and the tire equator line CL divided by the half tread width T.

Table 2 shows the evaluation results for tread patterns (Working Examples 2, 4, and 5, Comparative Example 4, 5) with the same configuration as Working Example 2 as shown in Table 1 in that the position of the circumferential primary grooves and the ratio P3/LB were fixed (position of circumferential primary groove=from 35% to 55%, ratio P3/LB=0.06) except that the ratio c/T was varied. Furthermore, Table 2 shows the evaluation results for tread patterns (Working Examples 6 to 8, Comparative Example 6 and 7) in which the position of the circumferential primary grooves and the ratio c/T were fixed (position=from 35% to 55%, ratio c/T=0.01) and the ratio P3/LB was varied.

Table 3 shows the evaluation results for tread patterns (Working Examples 9 to 12) in which the position of the circumferential primary grooves, the ratio c/T, and the ratio P3/LB were set within the ranges of the present embodiment and the ratio D2/T was varied.

Table 4 shows the evaluation results for tread patterns (Working Examples 13 to 17) in which the position of the circumferential primary grooves, the ratio c/T, and the ratio P3/LB were set within the ranges of the present embodiment and the ratio P4/WB was varied. Furthermore, Table 4 shows the evaluation results for tread patterns (Working Examples 18 to 22) in which the position of the circumferential primary grooves, the ratio c/T, and the ratio P3/LB were set within the ranges of the present embodiment and the ratio LB/WB was varied.

Table 5 shows the evaluation results of an embodiment (Working Examples 23, 24) in which configuration were similar to the Working Examples 1 and 2 of Table 1 except that the center lug grooves 14 were not provided with the first groove turning portion 14a and the second groove turning portion 14b.

TABLE 1-1

| | Conventional Example | Comparative Example 1 | Comparative Example 2 |
|---|---|---|---|
| wave-like circumferential primary grooves | Absent | Present | Present |
| Position of circumferential primary grooves | — | 25-65% | 25-45% |
| c/T | — | 0.2 | 0.1 |
| P3/LB | — | 0.075 | 0.06 |
| Raised bottom portion of circumferential primary grooves | Absent | Absent | Absent |
| D2/T | — | — | — |
| Circumferential secondary groove and fifth and sixth groove turning portions | Absent | Absent | Absent |
| P4/WB | — | — | — |
| LB/WB | 0.9 | 0.9 | 0.9 |
| Uneven wear resistance | 100 | 102 | 101 |
| Traction characteristics | 100 | 98 | 98 |

TABLE 1-2

| | Working Example 1 | Working Example 2 | Working Example 3 | Comparative Example 3 |
|---|---|---|---|---|
| Wave-like circumferential primary grooves | Present | Present | Present | Present |
| Position of circumferential primary grooves | 30-50% | 35-55% | 40-60% | 45-65% |
| c/T | 0.1 | 0.1 | 0.1 | 0.1 |
| P3/LB | 0.06 | 0.06 | 0.06 | 0.06 |
| Raised bottom portion of circumferential primary grooves | Absent | Absent | Absent | Absent |
| D2/T | — | — | — | — |
| Circumferential secondary groove and fifth and sixth groove turning portions | Absent | Absent | Absent | Absent |
| P4/WB | — | — | — | — |
| LB/WB | 0.9 | 0.9 | 0.9 | 0.9 |
| Uneven wear resistance | 111 | 113 | 112 | 103 |
| Traction characteristics | 101 | 101 | 102 | 100 |

TABLE 2-1

| | Comparative Example 4 | Working Example 4 | Working Example 5 | Comparative Example 5 | Comparative Example 6 |
|---|---|---|---|---|---|
| Wave-like circumferential primary grooves | Present | Present | Present | Present | Present |
| Position of circumferential primary grooves | 41-49% | 40-50% | 30-60% | 25-65% | 35-55% |
| c/T | 0.04 | 0.05 | 0.15 | 0.2 | 0.1 |
| P3/LB | 0.06 | 0.06 | 0.06 | 0.06 | 0.02 |
| Raised bottom portion of circumferential primary grooves | Absent | Absent | Absent | Absent | Absent |
| D2/T | — | — | — | — | — |
| Circumferential secondary groove and fifth and sixth groove turning portions | Absent | Absent | Absent | Absent | Absent |
| P4/WB | — | — | — | — | — |
| LB/WB | 0.9 | 0.9 | 0.9 | 0.9 | 0.9 |
| Uneven wear resistance | 101 | 107 | 109 | 101 | 100 |
| Traction characteristics | 100 | 101 | 101 | 103 | 99 |

TABLE 2-2

| | Working Example 6 | Working Example 7 | Working Example 8 | Comparative Example 7 |
|---|---|---|---|---|
| Wave-like circumferential primary grooves | Present | Present | Present | Present |
| Position of circumferential primary grooves | 35-55% | 35-55% | 35-55% | 35-55% |
| c/T | 0.1 | 0.1 | 0.1 | 0.1 |
| P3/LB | 0.03 | 0.05 | 0.07 | 0.08 |
| Raised bottom portion of circumferential primary grooves | Absent | Absent | Absent | Absent |
| D2/T | — | — | — | — |
| Circumferential secondary groove and fifth and sixth groove turning portions | Absent | Absent | Absent | Absent |
| P4/WB | — | — | — | — |
| LB/WB | 0.9 | 0.9 | 0.9 | 0.9 |
| Uneven wear resistance | 106 | 112 | 111 | 102 |
| Traction characteristics | 102 | 102 | 101 | 100 |

TABLE 3

| | Working Example 9 | Working Example 10 | Working Example 11 | Working Example 12 |
|---|---|---|---|---|
| Wave-like circumferential primary grooves | Present | Present | Present | Present |
| Position of circumferential primary grooves | 35-55% | 35-55% | 35-55% | 35-55% |
| c/T | 0.1 | 0.1 | 0.1 | 0.1 |
| P3/LB | 0.06 | 0.06 | 0.06 | 0.06 |
| Raised bottom portion of circumferential primary grooves | Present | Present | Present | Present |
| D2/T | 0.07 | 0.05 | 0.045 | 0.03 |
| Circumferential secondary groove and fifth and sixth groove turning portions | Absent | Absent | Absent | Absent |
| P4/WB | — | — | — | — |
| LB/WB | 0.9 | 0.9 | 0.9 | 0.9 |
| Uneven wear resistance | 114 | 116 | 116 | 117 |
| Traction characteristics | 101 | 101 | 101 | 101 |

TABLE 4-1

| | Working Example 13 | Working Example 14 | Working Example 15 | Working Example 16 | Working Example 17 |
|---|---|---|---|---|---|
| Wave-like circumferential primary grooves | Present | Present | Present | Present | Present |
| Position of circumferential primary grooves | 35-55% | 35-55% | 35-55% | 35-55% | 35-55% |
| c/T | 0.1 | 0.1 | 0.1 | 0.1 | 0.1 |
| P3/LB | 0.06 | 0.06 | 0.06 | 0.06 | 0.06 |
| Raised bottom portion of circumferential primary grooves | Present | Present | Present | Present | Present |

TABLE 4-1-continued

|  | Working Example 13 | Working Example 14 | Working Example 15 | Working Example 16 | Working Example 17 |
|---|---|---|---|---|---|
| D2/T | 0.04 | 0.04 | 0.04 | 0.04 | 0.04 |
| Circumferential secondary groove and fifth and sixth groove turning portions | Present | Present | Present | Present | Present |
| P4/WB | 0.01 | 0.02 | 0.05 | 0.07 | 0.08 |
| LB/WB | 0.9 | 0.9 | 0.9 | 0.9 | 0.9 |
| Uneven wear resistance | 118 | 120 | 122 | 121 | 119 |
| Traction characteristics | 101 | 101 | 101 | 101 | 100 |

TABLE 4-2

|  | Working Example 18 | Working Example 19 | Working Example 20 | Working Example 21 | Working Example 22 |
|---|---|---|---|---|---|
| Wave-like circumferential primary grooves | Present | Present | Present | Present | Present |
| Position of circumferential primary grooves | 35-55% | 35-55% | 35-55% | 35-55% | 35-55% |
| c/T | 0.1 | 0.1 | 0.1 | 0.1 | 0.1 |
| P3/LB | 0.06 | 0.06 | 0.06 | 0.06 | 0.06 |
| Raised bottom portion of circumferential primary grooves | Present | Present | Present | Present | Present |
| D2/T | 0.04 | 0.04 | 0.04 | 0.04 | 0.04 |
| Circumferential secondary groove and fifth and sixth groove turning portions | Present | Present | Present | Present | Present |
| P4/WB | 0.05 | 0.05 | 0.05 | 0.05 | 0.05 |
| LB/WB | 0.5 | 0.6 | 0.7 | 0.8 | 0.9 |
| Uneven wear resistance | 119 | 124 | 126 | 125 | 122 |
| Traction characteristics | 101 | 101 | 101 | 101 | 101 |

TABLE 5

|  | Working Example 23 | Working Example 24 |
|---|---|---|
| Wave-like circumferential primary grooves | Present | Present |
| Position of circumferential primary grooves | 30-50% | 35-55% |
| c/T | 0.1 | 0.1 |
| P3/LB | 0.06 | 0.06 |
| Raised bottom portion of circumferential primary grooves | Absent | Absent |
| D2/T | — | — |
| Circumferential secondary groove and fifth and sixth groove turning portions | Absent | Absent |
| P4/WB | — | — |
| LB/WB | 0.9 | 0.9 |
| Uneven wear resistance | 108 | 110 |
| Traction characteristics | 101 | 101 |

As seen by comparing Comparative Examples 2 to 7 and Working Examples 1 to 8 of Tables 1 and 2, configurations in which the circumferential primary grooves 12 are disposed at positions in a range from 30% to 60% of half of the tread width T from the tire equator line CL, the ratio c/T is from 0.05 to 0.15, and the ratio P3/LB is from 0.03 to 0.07 have improved uneven wear resistance and traction characteristics.

As seen in Table 3, the ratio D2/T is preferably 0.05 or less, more preferably less than 0.05, and even more preferably 0.03 or less from the perspective of improving uneven wear resistance.

As seen in Table 4, a circumferential secondary groove 20 provided with the fifth and sixth groove turning portions 21a, 21b is preferably disposed and the ratio LB/WB is preferably from 0.6 to 0.8 from the perspective of improving uneven wear resistance.

As seen in Working Examples 23, 24 of Table 5, the effects of the present embodiment can be obtained without providing the first groove turning portion 14a and the second groove turning portion 14b in the center lug grooves 14 of the tread pattern. However, as seen by comparing the measurement results of Working Examples 23, 24 and the measurement results of Working Example 1 and 2 of Table 1, the first groove turning portion 14a and the second groove turning portion 14b are preferably disposed in the center lug grooves 14 of the tread pattern from the perspective of improving uneven wear resistance.

This clearly demonstrates the effect of the present embodiment.

The foregoing has been a detailed description of the heavy duty pneumatic tire of the present technology. However, the present technology is not limited to the above embodiments, and may be improved or modified in various ways within the scope of the present technology.

The invention claimed is:
1. A heavy duty pneumatic tire, comprising:
a tread pattern, the tread pattern comprising
a plurality of center lug grooves disposed at intervals in a tire circumferential direction, wherein the plurality of center lug grooves each crosses a tire equator line and extends in a half-tread region on a first side and a second side of the tire equator line in a tire width direction with opposite ends disposed in the first side and the second side, respectively, and wherein the plurality of center lug grooves have a constant groove width P3 between the opposite ends,
a plurality of shoulder lug grooves disposed at intervals in the tire circumferential direction, wherein in both of the half-tread regions, the plurality of shoulder lug grooves extend outward in the tire width direction so that outer ends in a tread width direction open to ground contact edges on opposite sides in the tread width direction, and with respect to the tire circumferential direction, the plurality of shoulder lug grooves are each disposed between ends of center lug grooves adjacent in the tire circumferential direction of the plurality of center lug grooves, a pair of circumferential main grooves disposed in the half-tread regions with a wave-like shape, wherein in both of the half-tread regions, the circumferential main grooves extend around an entire circumference of the pneumatic tire with the ends of the plurality of the center lug grooves and inner ends of the plurality of shoulder lug grooves in the tire width direction alternately connecting to the circumferential main grooves, and the circumferential main grooves have a narrower groove width than the plurality of shoulder lug grooves, and a plurality of center blocks formed in a row in the tire circumferential direction defined by the plurality of center lug grooves and the pair of circumferential main grooves; and a plurality of circumferential subsidiary grooves provided in regions of the plurality of center blocks respectively, wherein the circumferential main grooves are disposed on opposite side of the tire equator line in a tread portion in the tire width direction in regions spaced apart from the tire equator line a distance of from 30% to 60% of half of a tread width T;

a ratio c/T of a lateral variation c of the wave-like shape of the pair of circumferential main grooves to the tread width T is from 0.05 to 0.15;

a ratio P3/LB of the constant groove width P3 of the plurality of center lug grooves to a maximum length LB in the tire circumferential direction of the plurality of center blocks is a constant value within a range of from 0.03 to 0.07 in each of the plurality of center lug grooves; and the plurality of center lug grooves each comprises a first groove turned portion disposed on the first side that bends or curves protruding toward a third side in the tire circumferential direction, and a second groove turned portion disposed on the second side that bends or curves protruding toward a fourth side opposite the third side in the tire circumferential direction;

a first connection end portion on the first side and a second connection end portion on the second side where the center lug groove connects to the circumferential main grooves connects to inner ends in the tire width direction of the circumferential main grooves and the second connection end portion is located further to the third side in the tire circumferential direction than the first connection end portion;

an inclination angle with respect to the tire width direction of a first straight line that joins the first connection end portion and a protruding end where the first groove turned portion protrudes toward the third side in the tire circumferential direction and an inclination angle with respect to the tire width direction of a second straight line that joins the second connection end portion and a protruding end where the second groove turned portion protrudes toward the fourth side in the tire circumferential direction are greater than an inclination angle with respect to the tire width direction of a third straight line that joins the first connection end portion and the second connection end portion of the center lug groove, the straight lines following center positions in a groove width direction of the center lug groove;

each of the circumferential subsidiary grooves extending in the tire circumferential direction, connecting center lug grooves adjacent in the tire circumferential direction of the plurality of center lug grooves, and having a groove end on the third side connecting to the first groove turned portion protruding toward the third side in the tire circumferential direction and a groove end on the fourth side connecting to the second groove turned portion protruding toward the fourth side in the tire circumferential direction; and each of the circumferential subsidiary grooves including an inclined portion inclined with respect to the tire circumferential direction and the tire width direction when intersecting the tire equator line, an inclination direction of the inclined portion with respect to the tire width direction being different from inclination directions of the first straight line, the second straight line, and the third straight line with respect to the tire width direction.

2. The heavy duty pneumatic tire according to claim 1, wherein a portion of the center lug groove between the protruding end where the first groove turned portion protrudes toward the third side in the tire circumferential direction and the first connection end portion is disposed on the first straight line or on the third side of the first straight line; and a portion of the center lug groove between the protruding end where the second groove turned portion protrudes toward the fourth side in the tire circumferential direction and the second connection end portion is disposed on the second straight line or on the fourth side of the second straight line, relating to center positions in a groove width direction of the center lug groove.

3. The heavy duty pneumatic tire according to claim 1, further comprising a raised bottom portion in each of the pair of circumferential main grooves which is a portion where groove depth is shallow.

4. The heavy duty pneumatic tire according to claim 3, wherein a ratio D2/T of a shallowest groove depth D2 of the raised bottom portion to the tread width T in the tire width direction of the tread portion is in a range of from $0.03 \leq D2/T \leq 0.045$.

5. The heavy duty pneumatic tire according to claim 1, wherein a ratio LB/WB of a maximum length LB in the tire circumferential direction of the plurality of center blocks to a maximum width WB in the tire width direction of the plurality of center blocks is from 0.6 to 0.8.

6. The heavy duty pneumatic tire according to claim 1, wherein a third groove turned portion bent or curved outward in the tire width direction and a fourth groove turned portion bent or curved inward in the tire width direction are disposed in the pair of circumferential main grooves to form a wave-like shape; and apex portions of the plurality of center blocks formed corresponding to the third groove turned portions are corner portions with an obtuse angle.

7. The heavy duty pneumatic tire according to claim 1, wherein the groove width of the pair of circumferential main grooves and a groove width of the plurality of center lug grooves are from 7 mm to 20 mm.

8. The heavy duty pneumatic tire according to claim 1, wherein the heavy duty pneumatic tire is mounted on a construction vehicle or an industrial vehicle.

9. A heavy duty pneumatic tire, comprising:

a tread pattern, the tread pattern comprising a plurality of center lug grooves disposed at intervals in a tire circumferential direction, wherein the plurality of center lug grooves each crosses a tire equator line and extends in a half-tread region on a first side and a second side of the tire equator line in a tire width direction with opposite ends disposed in the first side and the second side, respectively, and wherein the plurality of center lug grooves have a constant groove width P3 between the opposite ends, a plurality of shoulder lug grooves disposed at intervals in the tire circumferential direction, wherein in both of the half-tread regions, the plurality of shoulder lug grooves extend outward in the tire width direction so that outer ends in a tread width direction open to ground contact edges on opposite sides in the tread width direction, and with respect to the tire circumferential direction, the plurality of shoulder lug grooves are each disposed between ends of center lug grooves adjacent in the tire circumferential direction of the plurality of center lug grooves, a pair of circumferential main grooves disposed in the half-tread regions with a wave-like shape, wherein in both of the half-tread regions, the circumferential main grooves extend around an entire circumference of the pneumatic tire with the ends of the plurality of the center lug grooves and inner ends of the plurality of shoulder lug grooves in the tire width direction alternately connecting to the circumferential main grooves, and the circumferential main grooves have a narrower groove width than the plurality of shoulder lug grooves, and a plurality of center blocks formed in a row in the tire circumferential direction defined by the plurality of center lug grooves and the pair of circumferential main grooves; and a plurality of circumferential subsidiary grooves provided in regions of the plurality of center blocks respectively, wherein the circumferential main grooves are disposed on opposite side of the tire equator line in a tread portion in the tire width direction in regions spaced apart from the tire equator line a distance of from 30% to 60% of half of a tread width T;

a ratio c/T of a lateral variation c of the wave-like shape of the pair of circumferential main grooves to the tread width T is from 0.05 to 0.15;

a ratio P3/LB of the constant groove width P3 of the plurality of center lug grooves to a maximum length LB in the tire circumferential direction of the plurality of center blocks is a constant value within a range of from 0.03 to 0.07 in each of the plurality of center lug grooves; and the plurality of center lug grooves each comprises a first groove turned portion disposed on the first side that bends or curves protruding toward a third side in the tire circumferential direction, and a second groove turned portion disposed on the second side that bends or curves protruding toward a fourth side opposite the third side in the tire circumferential direction;

a first connection end portion on the first side and a second connection end portion on the second side where the center lug groove connects to the circumferential main grooves connects to inner ends in the tire width direction of the circumferential main grooves and the second connection end portion is located further to the third side in the tire circumferential direction than the first connection end portion;

an inclination angle with respect to the tire width direction of a first straight line that joins the first connection end portion and a protruding end where the first groove turned portion protrudes toward the third side in the tire circumferential direction and an inclination angle with respect to the tire width direction of a second straight line that joins the second connection end portion and a protruding end where the second groove turned portion protrudes toward the fourth side in the tire circumferential direction are greater than an inclination angle with respect to the tire width direction of a third straight line that joins the first connection end portion and the second connection end portion of the center lug groove, the straight lines following center positions in a groove width direction of the center lug groove;

each of the circumferential subsidiary grooves extending in the tire circumferential direction, connecting center lug grooves adjacent in the tire circumferential direction of the plurality of center lug grooves, and having a groove end on the third side connecting to the first groove turned portion protruding toward the third side in the tire circumferential direction and a groove end on the fourth side connecting to the second groove turned portion protruding toward the fourth side in the tire circumferential direction;

each of the circumferential subsidiary grooves including an inclined portion that is inclined with respect to the tire circumferential direction and the tire width direction when intersecting the tire equator line, and each of the center lug grooves including a straight portion between the first groove turned portion and the second groove turned portion, the straight portion being inclined with respect to the tire circumferential direction and the tire width direction when intersecting the tire equator line, an inclination direction of the straight portion with respect to the tire width direction being identical to an inclination direction of the inclined portion with respect to the tire width direction.

* * * * *